United States Patent

[11] 3,627,917

[72] Inventors Hiroshi Sugaya
Suita-shi;
Fukashi Kobayashi, Hirakata-shi; Mitsuaki Ono; Kaoru Imanishi, both of Osaka, all of Japan

[21] Appl. No. 873,267
[22] Filed Nov. 3, 1969
[45] Patented Dec. 14, 1971
[73] Assignee Matsushita Electric Industrial Co., Ltd. Osaka, Japan
[32] Priorities Jan. 18, 1969
[33] Japan
[31] 44/4297;
Nov. 12, 1968, Japan, No. 43/100157; Nov. 13, 1968, Japan, No. 43/100087; Jan. 30, 1969, Japan, No. 44/8815; Jan. 30, 1969, Japan, No. 44/8816

[54] MAGNETIC TAPE DUPLICATING APPARATUS WITH BULK TRANSFER AND SEPARATE DUPLICATION OF LONGITUDINAL TRACK
9 Claims, 13 Drawing Figs.

[52] U.S. Cl. .......... 178/6.6 A, 179/100.2 E
[51] Int. Cl. .......... G11b 5/86, G11b 21/00, H04n 5/78
[50] Field of Search .......... 178/6.6 A; 179/100.2 E

[56] References Cited
UNITED STATES PATENTS

| | | | |
|---|---|---|---|
| 3,541,577 | 11/1970 | Lemke | 179/100.2 E |
| 2,666,813 | 1/1954 | Camras | 179/100.2 E |
| 2,867,692 | 1/1959 | Camras | 179/100.2 E |

*Primary Examiner*—Howard W. Britton
*Attorney*—Stevens, Davis, Miller & Mosher

ABSTRACT: A magnetic tape duplicating apparatus, wherein a prerecorded master tape having a recording track containing a signal of a relatively short wavelength such as a video signal and a recording track containing a signal of a relatively long wavelength such as an audio signal, and a nonrecorded slave tape are wound onto a common reel with the magnetic surfaces thereof being disposed in close contact with each other. A transfer field is applied to the said two tapes to achieve duplication, and during the rewinding of the two tapes, duplication is again effected with respect to the recording track containing the said relatively long wavelength signal to thereby correct interlayer duplication of the said relatively long wavelength signal recording track occurring during the application of the said transfer field.

H. SUGAYA,
F. KOBAYASHI,
M. ONO
AND
K. IMANISHI
INVENTOR

BY Stevens, Davis, Miller & Mosher
ATTORNEY

MAGNETIC TAPE DUPLICATING APPARATUS WITH BULK TRANSFER AND SEPARATE DUPLICATION OF LONGITUDINAL TRACK

This invention relates to a magnetic tape duplicating apparatus.

It is an object of this invention to provide a magnetic tape duplicating apparatus for magnetic tapes formed with a track having a signal of a long wavelength recorded therein such as an audio signal track, control signal track or the like and a track having a signal of a short wavelength such as a video signal as in the case of a tape for a video tape recorder for example.

Other objects, features and advantages of the present invention will become apparent from the following description taken in conjunction with the accompanying drawings, in which.

Figure 4:
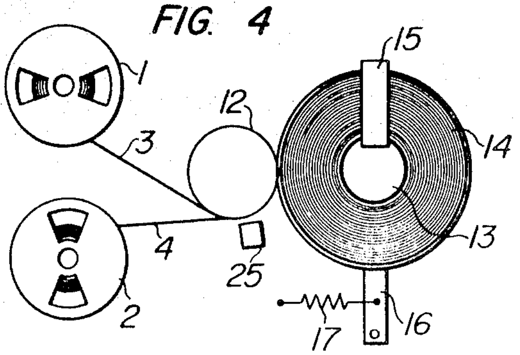
FIG. 4 is a plan view showing the magnetic tape duplicating system according to an embodiment of the present invention.
Figure 6A:
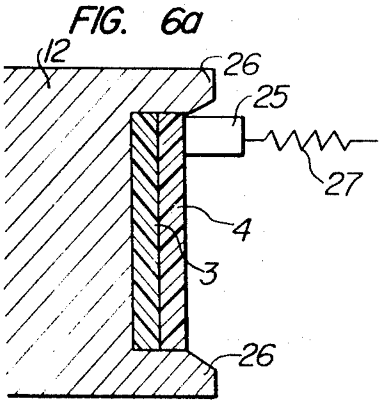
Figure 6B:
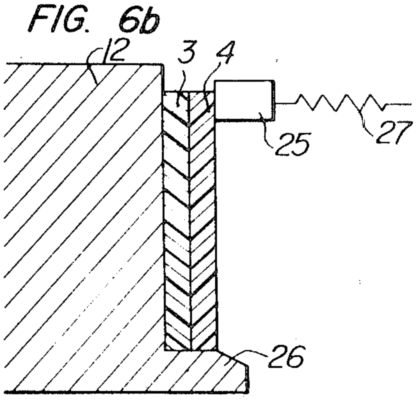
Figure 7:
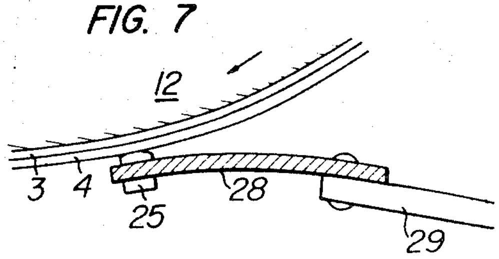
Figure 8:
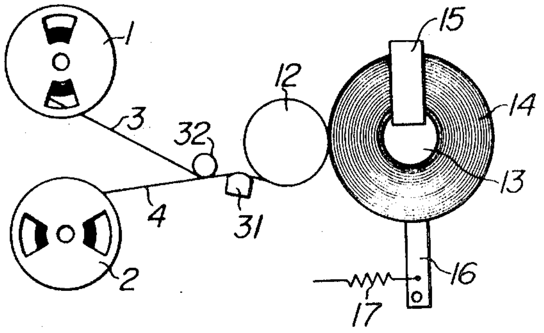
Figure 9:
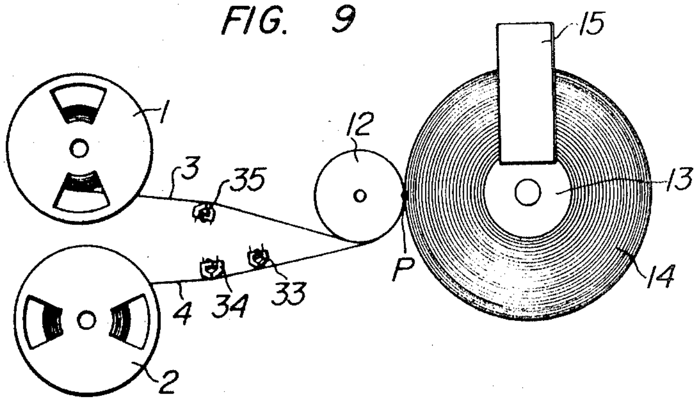
Figure 10:
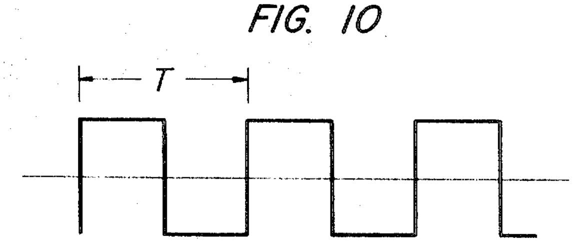
Figure 11:
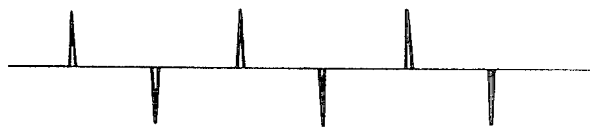
Figure 12:
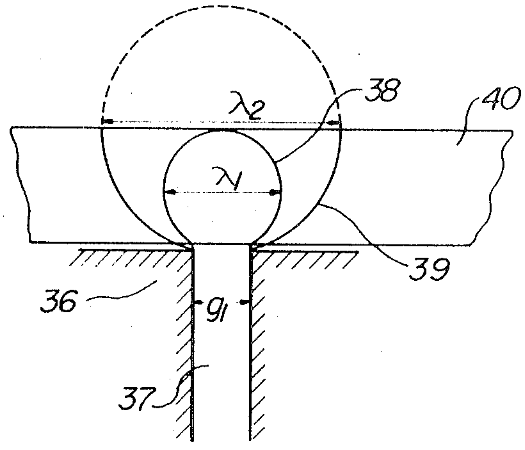

FIGS. 6*a*, 6*b*, and 7 are sectional and side views showing the main portions of the system shown in FIG. 4, respectively;

FIG. 8 is a plan view showing a second embodiment of the present invention;

FIG. 9 is a plan view showing a third embodiment of the present invention;

FIG. 10 is a view showing the waveform of a control signal used in the prior art;

FIG. 11 is a view showing the waveform of a control signal used in the present invention; and FIG. 12 is a view showing how the control signal shown in FIG. 11 is recorded.

Figure 1:
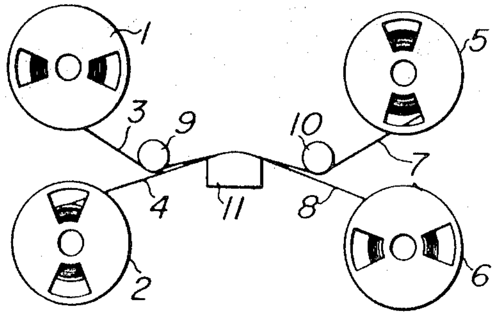
FIG. 1 is a view showing a conventional magnetic tape duplicating system.

Referring to FIG. 1, there is shown the conventional magnetic tape duplicating system utilizing the contact printing method, wherein numeral 1 represents a prerecorded master tape supply reel, and 2 a nonrecorded slave tape supply reel. The master tape 3 and slave tape 4 leaving the reels 1 and 2 respectively are placed so that the magnetic layer surfaces thereof may be brought into contact with each other. These tapes are transported on a transfer field generator 11 while being disposed in close contact with each other, so as to be wound onto takeup reels 5 and 6, respectively. Numerals 9 and 10 indicates guide posts for guiding the tape 3 respectively. When the master tape 3 and slave tape 4 are passed through the transfer field with the magnetic layer surfaces thereof disposed in close contact with each other, a signal recorded on the master tape is printed onto the slave tape. However, the system has such a disadvantage that when the two tapes are transported at high speed, an air film tends to be formed therebetween which makes it very difficult to achieve satisfactory contact of the tapes. Furthermore, in the high-speed transportation of the tapes, disagreement in speed between the tapes and vibration of the tapes tend to occur by which blurredness is caused during the duplicating operation so that the output is decreased. Especially in an attempt to effect duplication of a signal such as a video signal having a short recording wavelength as with a video tape, the duplicating efficiency is remarkably reduced. Due to the foregoing drawbacks, difficulty has been experienced in putting the aforementioned system to practical use.

Figure 2:
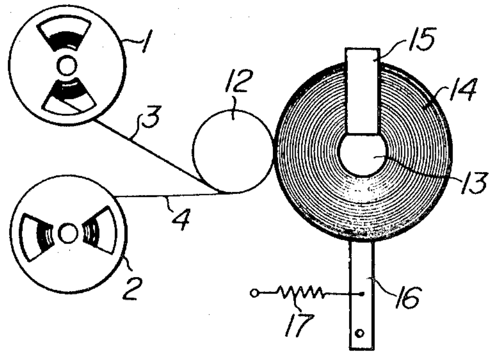
FIG. 2 is a view showing another conventional magnetic tape duplicating system.
Figure 3:
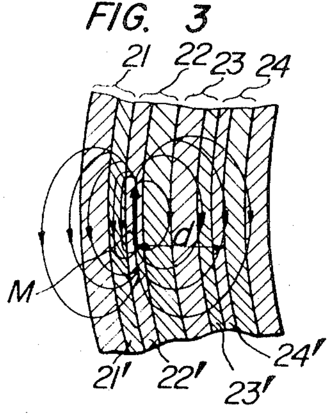
FIG. 3 is a sectional view useful for explaining a duplicating condition in bifiler tape winding system.

In order to solve the above-mentioned problems, there has been devised a new duplicating system as shown in FIG. 2, wherein the prerecorded master tape 3 and nonrecorded slave tape 4 unwound from the supply reels 1 and 2 respectively are simultaneously wound together onto a takeup reel 13, and duplication is effected therebetween by means of a transfer field generated by a transfer field generator 15 while these tapes are wound on the takeup reel. In the winding of the tapes, a pressure roller 12 is always pressed against the wound tape 14, whereby any air layer tending to be formed between the tapes is completely eliminated so that very satisfactory contact can be established between the tapes. In the system shown in FIG. 2, the transfer field is applied when the two tapes have been wound, and therefore the relative position between the tapes is completely fixed during duplication, so that the duplication is effected, so to speak, under a stationary state. Thus, the system of FIG. 2 is completely free from the problems with the FIG. 1 system such as disagreement in speed between the tapes and vibration of the tapes. Hence, the FIG. 2 system is especially effective in the duplication of a signal having a short recording wavelength. However, if the system of FIG. 2 is used for video tape duplication, it is very effective with respect to the video signal tracks having signals of a short wavelength recorded therein, but due to the presence of a control signal and audio signal tracks each having a long wavelength signal recorded therein, interlayer duplication thereof will become a problem, which is a phenomenon that in the case where the wavelength of a signal recorded on the master tape is long, the signal field of the master tape permeates through the slave tape in close contact with the master tape so as to reach the immediately adjacent slave tape so that duplication is effected also with respect to the latter under the action of the transfer field. This is shown in FIG. 3 which is a partial enlarged view showing the state that the master and slave tapes have simultaneously been wound together and which corresponds to the portion indicated at 14 in FIG. 2. Numerals 21 and 23 represent the slave tape, and 22 and 24 the master tape. Assume now that the magnetic layer 22′ of the master tape 22 is magnetized as indicated by M. Magnetic lines of force resulting from the magnetization M are permitted to pass through the magnetic layer 21′ of the slave tape 21 and act as a signal field, and an external transfer bias field is superimposed thereon so that duplication is effected with respect to the slave tape and the latter is magnetized. In this case, however, the magnetic lines of force emanating from the signal magnetization M are permitted to arrive also at the magnetic layer 23′ of the duplicating slave tape 23, so that duplication is simultaneously effected also with respect thereto upon application of a transfer bias field. Thus, so-called interlayer duplication is caused.

Such an interlayer duplication becomes a problem with the audio signal and control signal tracks on a video tape since it occurs in a signal range having a long recording wavelength. Therefore, in order to effect the duplication of a video tape by the contact printing method according to the system of FIG. 2, it is essential to solve the problem of interlayer duplication in audio and control tracks.

The spread of VTR and electronic computers has required a large quantity of video and computer tapes to be duplicated, but since high-speed duplication of such tapes is impossible by the conventional head-to-head duplicating system due to the fact that the wavelength of signals recorded on these tapes is extremely short, it is necessary to develop a new duplication technique. Among the duplicating systems which are expected to meet the foregoing requirement is the contact printing method, but such a conventional system as shown in FIG. 1 has never been put to practical use because such difficulty is involved in applying such a system to the duplication of a tape having a signal with a short wavelength recorded thereon. As a new contact printing method which is to be utilized in place of the above method there has been proposed such a bifilar tape winding system as shown in FIG. 2. This system is well suited to the duplication of tapes recorded with a signal of a short wavelength such as a video signal, but in duplication, the problem of interlayer duplication occurs with respect to audio signal tracks and control signal tracks. Therefore, the system of FIG. 2 cannot be applied to effect the duplication of video tapes.

In accordance with the present invention, there is provided a system which is capable of solving the aforementioned problem of interlayer duplication, thereby making it possible to achieve high-speed video tape duplication which has been most difficult and highly demanded. Thus, the system of this invention will have a great effect on the VTR industry.

The concrete construction of the present invention will now be described with reference to FIG. 4 which illustrates a contact printing method using the same bifilar tape winding system as that shown in FIG. 2. In FIG. 4, a signal recorded on the master tape 3 will be transferred to the slave tape 4 by applying a transfer bias field produced by the transfer bias field generator 15 to the tapes which are wound on the takeup reel 13 with the magnetic layer surfaces thereof disposed in close contact with each other. Experimental and theoretical examinations show that the amount of interlayer duplication which occurs at this point is attenuated following $-54.6(\lambda/d$db. as compared with a direct duplication output, where $\lambda$ is the recording wavelength, and $d$ is the distance from the magnetic layer of the slave tape to that of the master tape. A video signal recorded on a video tape is normally frequency-modulated, so that wavelengths recorded on the tape are in a range from 50–60 $\mu$m. to about 2 $\mu$m., and a majority of them are concentrated in the vicinity of 10 $\mu$m. Further, the base layer of a magnetic tape is about 25 $\mu$m. or 38 $\mu$m. thick, and therefore the distance from the magnetic layer of the master tape to that of the immediately adjacent slave tape turns out to be about 50 $\mu$m. or 76 $\mu$m.

Thus, if it is assumed that the wavelength of a recorded signal is 60 $\mu$m., then the amount of interlayer duplication will be as small as −45 db. or −69 db., which will constitute no problem from the practical standpoint. On the other hand, a large amount of interlayer duplication occurs with respect to the audio track since the wavelength of an audio signal directly recorded therein is distributed in so wide a range that it is as long as several mm. in the low-frequency range. Therefore, this system cannot be employed as it is. Furthermore, with the control signal track in a rotary head type VTR, too, the problem of interlayer duplication arises because of the fact that the wavelength of the control signal recorded therein is generally about 1 mm. although it slightly differs depending upon the type of VTR.

Figure 5:
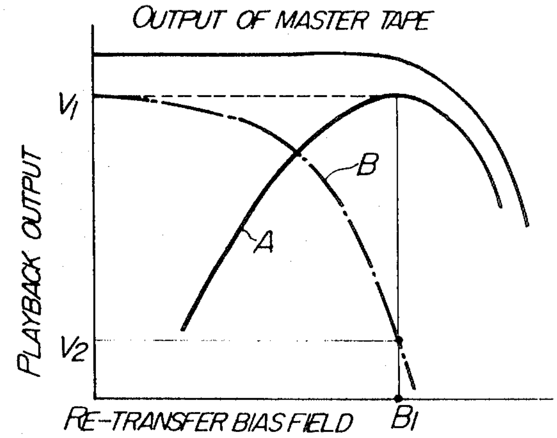
FIG. 5 is a view useful for explaining the operation of the system shown in FIG. 4.

As a concrete method of preventing the aforementioned interlayer duplication, the provision of a retransfer bias field generator 25 as shown in FIG. 4 is effective. In FIG. 4, the duplicated tapes are rewound onto the original reels 1 and 2, respectively. A transfer bias field is again applied to the audio track or control signal track, or both of them by the generator 25 provided at a position where the tapes are transported while being placed in contact with each other on the pressure roller 12 during the aforementioned rewinding process, whereby the audio track and/or control track on the slave tape subjected to interlayer duplication are again subjected to duplication so that the interlayer duplication is eliminated therefrom. FIG. 5 shows the signal characteristics of the reduplication.

In FIG. 5, the playback outputs (relative value) of the master tape and slave tape are indicated on the vertical axis, and the retransfer bias field (relative value) are indicated on the horizontal axis. $V_1$ is the playback output level of the slave tape duplicated with the aid of the transfer bias field generator 15 in FIG. 4. As described above, the transfer bias field is again applied to this slave tape while the latter is being rewound, and by increasing this retransfer bias field intensity, the signal previously duplicated onto the slave tape is faded away along the curve B starting with $V_1$. At the same time, the signal recorded on the master tape is newly transferred onto the slave tape with the aid of the retransfer bias field, and the level of the transferred signal increases with the bias field along the curve A and reach the maximum output point. At this point, the retransfer output becomes almost equal to the previous transfer output $V_1$, and the previously transferred signal is attenuated down to $V_2$. The ratio $V_1$ to $V_2$ depends upon the amounts of the coercive forces of the master and slave tapes, and it has been experimentally found that the ratio is −35 db. or higher in the case where the coercive force of the master tape is 800 oersteds and the coercive force of the slave tape is 270 oersteds for example. It has also been found that the optimum transfer bias field intensity $B_1$ is substantially equal to the optimum value in the transfer field generator 15 of FIG. 4, and that the master tape is by no means demagnetized due to the retransfer.

Furthermore, during the retransfer, there occurs no disagreement in speed between the tapes before the tapes arrive at the position of the transfer field generator 25, and therefore, only the interlayer duplicated signal on the slave tape is erased in the retransfer. The level of this interlayer duplicated signal is much lower than that of the main signal, and it is further erased by 35 db. or more by the retransfer bias field. In this way, the final level of the interlayer duplicated signal is made so low that no problem arises from the practical standpoint.

This retransfer system is based upon the same principle as that of the conventional so-called parallel transportation transfer system shown in FIG. 4, but it is substantially free from the problems such as disagreement in speed between the tapes and formation of an air film therebetween because of the fact that the wavelength of signals to be handled is relatively long since the retransfer is effected only with respect to the audio track and control track. Furthermore, this system is basically different in many respects from the system shown in FIG. 1, and as will be seen from FIG. 4, there is no place where air is sucked in between the tapes. Another advantage of this system is that there is substantially no possibility that disagreement in speed between the tapes occurs because these tapes are unwound from the same reel.

Referring now to FIG. 6, there is shown a method of mounting the retransfer bias field generator 25. The construction of this bias field generator 25 is varied according to whether an AC field or DC field is used as the transfer field. In the case where an audio signal is to be transferred, it is preferable to use a ring head with a gap length of several hundred microns because an AC field is generally advantageous with respect to duplication efficiency and so forth. FIG. 6a is a sectional side view showing the elements in the neighborhood of the retransfer bias field generator 25, wherein numeral 3 represents the master tape, and 4 the slave tape. The pressure roller on which the tapes are wound is provided with lugs 26 for positioning the tapes. The retransfer field generator 25 is brought into light contact with the tape 4 only at the position of the audio track or control track thereof by means of a spring 27. In the case where it is possible to sufficiently prevent the runout of the pressure roller 12 by means of precision working, there is no need to always place the transfer field generator 25 in contact with the slave tape 4. In such a case, the field generator 25 may be provided at a position spaced apart from the tape a predetermined distance.

In case the runout of the pressure roller 12 is too great, then the lugs 26 of the roller tend to collide with the retransfer bias field generator 25, and in such a case, one of the lugs 26 may be removed.

FIG. 7 shows another example of the method of holding transfer field generator 25. Numeral 28 represents a leaf spring for holding the field generator 25 and which is fixed to a support member 29. By using the leaf spring 28, it is possible not only to prevent upward and downward vibrations of the retransfer bias field generator 25 but also to dispose the field generator 25 in light contact with the tape 4 with a constant pressure.

FIG. 8 shows a second embodiment of the present invention, wherein a retransfer bias field generator 31 is provided between the pressure roller 12 and a position determining guide post 32 instead of on a portion of the pressure roller 12, so that the contact of the field generator 31 with the tapes 3 and 4 can be facilitated. With such an arrangement, the problem of the shaft and face runout of the pressure-roller can be avoided so that the method of holding the field generator 31 can be simplified. In all the above cases, it is required that the drive torque of the rewinding motor be sufficiently increased lest the transportation of the tapes should be adversely influenced by the contact between the retransfer bias field generator and the tapes during the rewinding operation.

By any of the foregoing methods, interlayer duplication can be prevented. For an extremely long wavelength, however, there is a tendency that a satisfactory tone quality cannot be achieved with the aforementioned duplication system. This is an unavoidable drawback of the contact printing method. Theoretical and experimental examinations show that the longer the recorded wavelength, the lower becomes the efficiency of duplication. Therefore, in the case where as high a tone quality as in the case of hi-fi is desired, the contact printing method turns out to be insufficient. Especially in the case of the printing of video tapes for broadcast, a high S/N in audio signal is required by the broadcast standard.

Referring to FIG. 9, there is shown a third embodiment of the present invention which is effective in the above case. In FIG. 9, an erase head 33 is provided along the rewinding path of the slave tape 4. Those portions of the signal transferred to the slave tape by means of the transfer bias field generator 15 which are recorded in the audio track and/or control track are erased, and thereafter the audio track and/or control track of the master tape 3 are reproduced by means of a playback head 35 provided in association with the master tape. A signal thus reproduced is suitably amplified, and then rerecorded by means of a recording head 34 provided in association with the slave tape 4. By providing the playback head 35 and record head 34 at positions equally spaced apart from a point P where the pressure roller 12 is pressed against the wound tapes 14, it is possible to eliminate disagreement in phase between the video signal and the audio and control signals. Preferably the tape speed is maintained as constant as possible during the rewinding operation. However, since the speeds of the master and slave tapes are always equal to each other, there is no need to control these speeds to make them exactly equal to each other. That is, speed variations to some extent are not critical. Needless to say, it is necessary to provide an equalizer circuit for eliminating any variation in the head output which is caused due to speed variation. Furthermore, the recording bias frequency should be sufficiently high. With such an arrangement, the problem of interlayer duplication can be solved, and thus an audio track recording with a satisfactory tone quality and S/N is possible.

In this case, the rewinding speed can be made sufficiently high since the frequency band of the audio signal is considerably lower than that of the video signal. However, there is still a limitation. The reason is that as the speed increases, the playback frequency becomes higher so that greater difficulty is encountered in the reproducing and recording operation, both electromagnetically and mechanically. In order to enhance the printing efficiency, on the other hand, it is necessary to increase both the taking-up speed and rewinding speed. That is, it is required that these two speeds be balanced. For this reason, in the actual apparatus, it is desirable that the takeup speed be increased as much as possible whereas the rewinding speed is maintained in a sufficient range to achieve a satisfactory tone quality and S/N. That is, it is necessary to make the takeup speed higher than the rewinding speed. Of course, this method is applicable not only to an audio signal but also to a control signal. Since the control signal is usually recorded in the manner of one pulse per video track, the pulse width is so great that the recorded wavelength becomes very long. Such a signal has a tendency that during duplication the efficiency is lowered so that the duplicating output is considerably attenuated. Hence, the method described above in connection with FIG. 8 turns out to be very effective.

As the control signal, a rectangular waveform as shown in FIG. 10 is usually used. A number of advantages can be obtained in the duplication by differentiating the rectangular waveform as shown in FIG. 11. That is, the use of impulses like the differentiated waveform shown in FIG. 11 makes the recorded wavelength substantially equal to the gap length of the recording head, so that it is possible to make the wavelength very short. In this way, not only the problem of interlayer duplication is naturally solved, but also the efficiency of duplication is enhanced.

FIG. 12 shows the magnetization occurring in a tape when the control signal in the form of an impulse is supplied to the head. Numeral 36 indicates the pole tip of a control signal recording head, and 37 the gap thereof. If a low-recording current is supplied to the head, that portion of the tape which is enclosed by a circle at 38 is magnetized, while if a high-recording current is supplied to the head, that portion of the tape which is enclosed by circle at 39 is magnetized. In these cases, the recorded wavelengths become equivalently $\lambda_1$ and $\lambda_2$, respectively.

It has theoretically and experimentally been confirmed that the amount of interlayer duplication is attenuated at a rate of $54.6d/\lambda$ db., where $d$ is the interlayer distance and $\lambda$ is the recorded wavelength. In order to eliminate interlayer duplication, therefore, it is necessary to make $d/\lambda$ as great as possible.

The experimental results show that if S/N of the control signal is 10 db. at minimum, it is possible to prevent the circuit from performing an erroneous operation. Thus, $\lambda$ should be selected so as to meet such a condition as $d/\lambda \geq 0.18$. To this end, it is necessary to suitably select the correct amount of recording current and gap length of the head. As described above, if the recording current is excessively increased, then the recorded wavelength will also be correspondingly increased. Furthermore, an increase of the head gap length will also constitute a cause for an increase of the recorded wavelength.

In actually, however, since the interlayer distance between adjacent tapes is 50 microns or greater in ordinary cases, substantially no interlayer duplication occurs in the case of impulse recording.

By using impulses as the control signal as described above, the recorded wavelength can be reduced so that the influence of interlayer duplication is practically eliminated. In this way, it is possible to prevent any error from occurring in the control operation during the reproduction of a duplicated tape.

What is claimed is:

1. A magnetic tape duplicating apparatus comprising means for winding onto a common reel a prerecorded master tape having a first recording track which is at a slant with respect to the longitudinal direction of the tape in which is mainly recorded a signal having a wavelength which is relatively short as compared with the total thickness of the master and slave tapes in use and a second recording track in said longitudinal direction in which is dominantly recorded a signal having a relatively long wavelength, and a nonrecorded slave tape, said tapes being superimposed upon each other in such a manner that the magnetic layer surfaces thereof are disposed in contact with each other; means for applying a first transfer bias field to the wound tapes; and means for duplicating only the track having said relatively long wavelength signal of said master tape to said slave tape during the rewinding onto the original reels of said tapes to which the first transfer bias field has been applied.

2. A magnetic tape duplicating apparatus according to claim 1, wherein the signal of a relatively short wavelength is a frequency-modulated video signal, and the signal of a relatively long wavelength is an audio signal or a control signal.

3. A magnetic tape duplicating apparatus according to claim 1, wherein the recording track having the relatively short wavelength signal mainly recorded therein contains a frequency-modulated video signal, and the recording track having the relatively long wavelength signal dominantly recorded therein contains a control signal recorded in the form of an impulse current for a rotary head type video tape recorder.

4. A magnetic tape duplicating apparatus comprising means for winding onto a common reel a prerecorded master tape having a first recording track which is at a slant with respect to the longitudinal direction of the tape in which is mainly recorded a signal having a wavelength which is relatively short as compared with the total thickness of the master and slave tapes in use and a second recording track in said longitudinal direction in which is dominantly recorded a signal having a relatively long wavelength, and a nonrecorded slave tape, said tapes being superimposed upon each other in such a manner that the magnetic layer surfaces thereof are disposed in contact with each other; means for applying a first transfer bias field to the wound tapes; means for rewinding the tapes having said first transfer bias field onto the original reels with said two tapes disposed in close contact with each other for a predetermined interval; and means for applying a second transfer bias field provided by a second transfer bias field generator only to the recording track containing said relatively long wavelength signal while said tapes are disposed in close contact with each other.

5. A magnetic tape duplicating apparatus comprising means for winding onto a rotating roller through a predetermined angle a prerecorded master tape having a first recording track which is at a slant with respect to the longitudinal direction of the tape in which is mainly recorded a signal having a wavelength which is relatively short as compared with the total thickness of the master and slave tapes in use and a second recording track in said longitudinal direction of the tape in which is dominantly recorded a signal having a relatively long wavelength, and a nonrecorded slave tape, these tapes being superimposed upon each other in such a manner that the magnetic layer surfaces thereof are disposed in contact with each other, and thereafter successively taking up said tapes coaxially; means for applying a first transfer field to the taken-up tapes; means for rewinding onto the respective reels the tapes having the first transfer field applied thereto along the same path as that along which said tapes were taken up, and means for applying a second transfer bias field only to the recording track containing said relatively long wavelength of said tapes on said roller during the rewinding operation.

6. A magnetic tape duplicating apparatus according to claim 5, further comprising means for pressing said second transfer bias field generator against said rotating roller through said two tapes only during the rewinding of said tapes.

7. A magnetic tape duplicating apparatus comprising means for continuously winding onto a common reel a prerecorded master tape having a first recording track which is at a slant with respect to the longitudinal direction of the tape in which is mainly recorded a signal having a wavelength which is relatively short as compared with the total thickness of the master and slave tapes in use and a second recording track in said longitudinal direction in which is dominantly recorded a signal having a relatively long wavelength, and a nonrecorded slave tape; a pressure roller pressed against said two tapes having the magnetic layer surfaces thereof disposed in close contact with each other by means of a positioning guide post; means for applying a first transfer bias field to the wound tapes; and means for applying a second transfer bias field only to the recording track containing said relatively long wavelength between said positioning guide post and said pressure roller in the process of rewinding said tapes to the original reels respectively.

8. A magnetic tape duplicating apparatus comprising means for winding onto a common reel a prerecorded master tape having a first recording track which is at a slant with respect to the longitudinal direction of the tape in which is mainly recorded a signal having a wavelength which is relatively short as compared with the total thickness of the master and slave tapes in use and a second recording track in said longitudinal direction of the tape in which is dominantly recorded a signal having a relatively long wavelength, and a nonrecorded slave tape, with the magnetic surfaces thereof being disposed in contact with each other; means for applying a predetermined transfer bias field to the two tapes wound on said reel; means for rewinding the two tapes having said transfer bias field applied thereto onto the original reels respectively; means for reproducing the signal from the recording track containing said relatively long wavelength of said master tape in the rewinding process; and means for erasing only the recording track having said relatively long wavelength duplicated onto the slave tape and recording the signal reproduced from said master tape in the erased track in said rewinding process.

9. A magnetic tape duplicating apparatus according to claim 8, wherein the speed at which the master and slave tapes are wound onto the common reel is made higher than the speed at which said tapes are rewound after said transfer bias field has been applied thereto.

* * * * *